J. D. TELFORD.
BRIDLE.
APPLICATION FILED JAN. 23, 1915.
1,159,291. Patented Nov. 2, 1915.
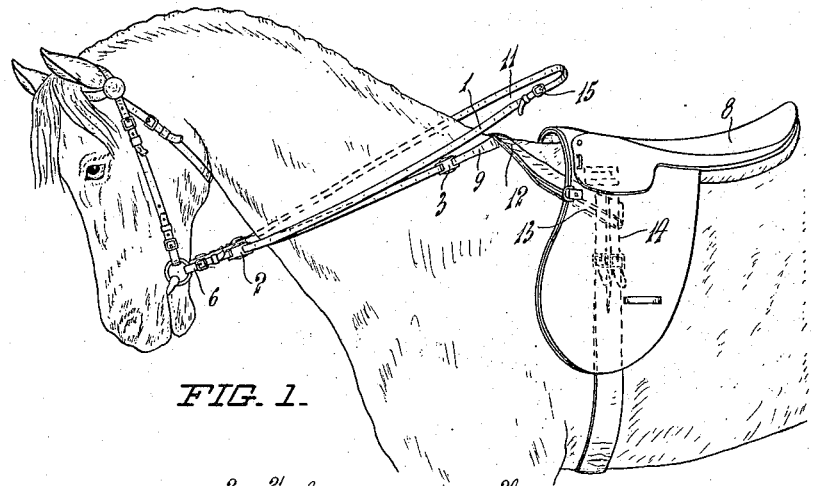
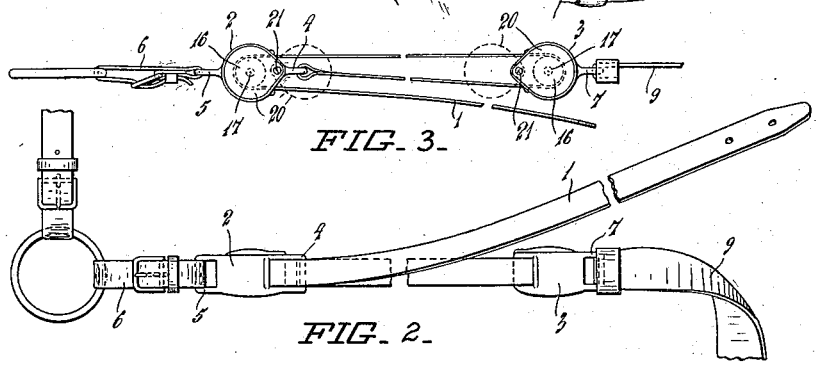
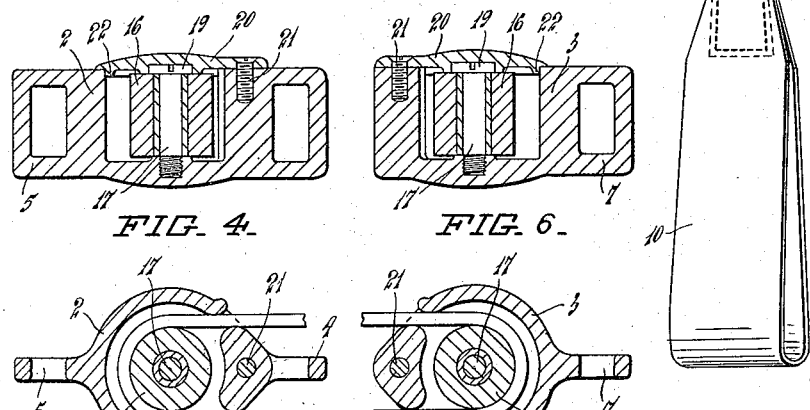
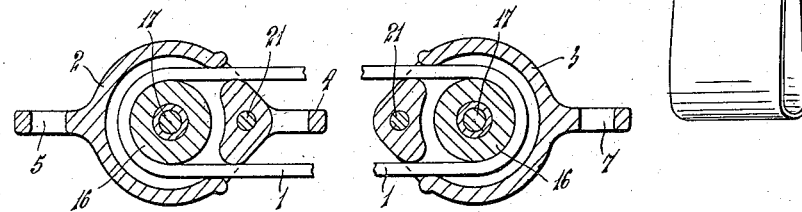
Witnesses:—
Charles B Crompton
May G. Luttrell
J. D. Telford.
Inventor.
By Croydon Marks
Attorney.

UNITED STATES PATENT OFFICE.

JOHN DEGIDON TELFORD, OF PALMERSTON NORTH, NEW ZEALAND.

BRIDLE.

1,159,291. Specification of Letters Patent. Patented Nov. 2, 1915.

Application filed January 23, 1915. Serial No. 3,886.

*To all whom it may concern:*

Be it known that I, JOHN DEGIDON TELFORD, a citizen of the Dominion of New Zealand, and residing at Palmerston North, in the Provincial District of Wellington, in the Dominion of New Zealand, have invented certain new and useful Improvements in Bridles, of which the following is a specification.

The invention relates to means employed for more effectively restraining horses which "pull on the bit."

According to my invention, reins of the ordinary flat leather type, are led around rollers so disposed and arranged that the mechanical advantage of pulley blocks is obtained. The reins attached to each end of the bit have this arrangement of rollers; a block carrying one of the rollers upon each rein being secured to a strap which passes across the withers of the horse and has its end anchored to the girth straps or other convenient part of the saddle or harness.

The invention is illustrated in the drawing wherein:—

Figure 1, is a side elevation showing the invention in use on a saddle horse. Fig. 2, is a side elevation, and Fig. 3, a plan showing the apparatus removed from the horse. Fig. 4, is a sectional plan, and Fig. 5, a side sectional elevation of one of the blocks, and Figs. 6 and 7 similar views on the other block.

The rein 1 is led around a roller in block 2 passes rearwardly around a roller in block 3 and then is carried forward and connected to a D-shaped loop 4 on block 2. Block 2 has a D-shaped loop 5 which is connected by a buckle strap 6 with the bit, and, block 3 has a D-shaped loop 7 connected with the girth straps of the saddle 8 by a strap 9 which passes across the withers of the horse, and has a loop 10 at its end, through which the girth straps upon the "off side" of the horse, are passed. The rein 11 used upon the off side of the horse passes through a similar arrangement of blocks each containing a roller a block corresponding exactly with block 3 being connected to a strap 12 which crosses strap 9 upon the withers of the horse and has a loop 13 upon its end through which the girth straps 14 on the "near side" are passed. The ends of reins 1 and 11 have their ends connected by a buckle 15.

The block 2 (as shown in Figs. 4 and 5) is comprised of a casing having the integrally formed D-shaped loops 4 and 5. The roller 16 is journaled on a spindle 17 screwed at one end into the casing and having a head 19, which keeps the roller upon the pin, a cover 20 secured to the casing by a screw pin 21 has a flange 22 closely fitting the opening of the casing and a recess in the underside of the cover receives the head of spindle 17, the end of which is thereby supported. By unscrewing the pin 21 a few turns, the cover may be turned around to give access to the roller and to enable the rein to be passed around it.

The block 3 (see Figs. 6 and 7) is constructed precisely similarly to block 2 except that the casing has a D-shaped loop at only one end. The straps 9 and 12 crossing over the withers of the horse are an important feature of the invention as most of the weight of the apparatus is thereby carried upon the withers and the pull upon the straps 9 and 12 is less likely to displace the saddle than if the straps went directly back alongside the shoulders of the animal.

What I do claim and desire to secure by Letters Patent of the United States is:—

1. Apparatus for the purpose indicated comprising a block, a D-shaped loop thereon, a strap for connecting said loop to a bit, a roller rotatable within said block, a second block arranged in rear of the first block and having a D-shaped loop, a strap secured to the last mentioned loop and adapted to cross the withers of a horse, means for anchoring the end of the last mentioned strap to the harness on the body of the horse, a roller rotatable in said second block, a rein connected to said first block and passing around both rollers and then rearwardly, and a duplicate set of the above mentioned parts, the rearwardly extending parts of the reins being joined to form a single rein.

2. Apparatus for the purpose indicated comprising a block, a D-shaped loop thereon, a strap for connecting said loop to a bit, a roller rotatable within said block, a second block arranged in rear of the first block and having a D-shaped loop, a strap secured to the last mentioned loop and adapted to cross the withers of a horse, means for anchoring the end of the last mentioned strap to the harness on the body of the horse, a roller rotatable in said second block, a rein connected to said first block and passing around both rollers and then rearwardly, means for retaining said rein on said rollers but permitting it to be removed laterally when desired, and a duplicate set of the above mentioned parts, the rearwardly extending parts of the reins being joined to form a single rein.

In testimony whereof I have signed my name to this specification in the presence of two witnesses.

JOHN DEGIDON TELFORD.

Witnesses:
HENRIE HAMPTON RAYWARD,
EDNA JOAN COLLEY.

Copies of this patent may be obtained for five cents each, by addressing the "Commissioner of Patents. Washington, D. C."